(12) United States Patent
Li

(10) Patent No.: US 10,606,886 B2
(45) Date of Patent: Mar. 31, 2020

(54) METHOD AND SYSTEM FOR REMOTE MANAGEMENT OF VIRTUAL MESSAGE FOR A MOVING OBJECT

(71) Applicant: Yu-Hsien Li, Taipei (TW)

(72) Inventor: Yu-Hsien Li, Taipei (TW)

( * ) Notice: Subject to any disclaimer, the term of this patent is extended or adjusted under 35 U.S.C. 154(b) by 433 days.

(21) Appl. No.: 15/581,924

(22) Filed: Apr. 28, 2017

(65) Prior Publication Data

US 2018/0181596 A1 Jun. 28, 2018

(30) Foreign Application Priority Data

Dec. 23, 2016 (TW) .............................. 105142995 A

(51) Int. Cl.
| | | |
|---|---|---|
| G06F 16/00 | (2019.01) | |
| G06F 16/58 | (2019.01) | |
| H04L 29/08 | (2006.01) | |
| G06F 16/51 | (2019.01) | |
| G06F 16/583 | (2019.01) | |
| G06Q 30/02 | (2012.01) | |

(52) U.S. Cl.
CPC .......... *G06F 16/5866* (2019.01); *G06F 16/00* (2019.01); *G06F 16/51* (2019.01); *G06F 16/5838* (2019.01); *G06Q 30/0241* (2013.01); *H04L 67/10* (2013.01)

(58) Field of Classification Search
CPC .. G06F 16/5866; G06F 16/00; G06F 16/5838; G06F 16/51; G06F 16/9537; G06F 16/951; G06F 16/954; G06Q 30/0241; H04L 67/10
See application file for complete search history.

(56) References Cited

U.S. PATENT DOCUMENTS

| | | | | |
|---|---|---|---|---|
| 6,813,395 | B1 * | 11/2004 | Kinjo | G06K 9/4604 |
| | | | | 382/282 |
| 2008/0020743 | A1 * | 1/2008 | Seo | H04L 51/34 |
| | | | | 455/418 |
| 2008/0263460 | A1 * | 10/2008 | Altberg | G06Q 30/02 |
| | | | | 715/757 |

(Continued)

FOREIGN PATENT DOCUMENTS

| | | |
|---|---|---|
| JP | 2011244398 A | 12/2011 |
| JP | 2013205995 A | 10/2013 |

(Continued)

*Primary Examiner* — Leslie Wong
(74) *Attorney, Agent, or Firm* — Li & Cai Intellectual Property (USA) Office

(57) ABSTRACT

The disclosure is related to a system and a method for remote management of a virtual message for a moving object. The system has a database that stores data of multiple moving objects and image information of every moving object. The system has a server initiating a remote-management interface that allows the system user to perform remote management. The interface also allows the user to select one of the moving objects and configure a virtual message associated to the moving object. A set of search criteria with respect to the virtual message are defined. In the server, the data relating to every moving object, virtual message and the search criteria is established. The system facilitates the user to conduct remote management of managing multiple virtual messages and their associated moving objects at the same time.

11 Claims, 14 Drawing Sheets

(56) References Cited

U.S. PATENT DOCUMENTS

| | | | |
|---|---|---|---|
| 2010/0228612 A1* | 9/2010 | Khosravy | G01C 21/20 705/14.4 |
| 2011/0161130 A1* | 6/2011 | Whalin | G06Q 10/10 705/7.18 |
| 2011/0170770 A1* | 7/2011 | Remedios | G06F 16/5838 382/162 |
| 2011/0276507 A1* | 11/2011 | O'Malley | G06Q 10/00 705/321 |
| 2012/0170856 A1* | 7/2012 | Yamaguchi | G06F 16/583 382/224 |
| 2013/0008958 A1* | 1/2013 | Smith | G07C 9/00904 235/382 |
| 2013/0012237 A1 | 1/2013 | Hamynen et al. | |
| 2013/0120373 A1 | 5/2013 | Morinaga et al. | |
| 2013/0259326 A1 | 10/2013 | Shudo | |
| 2013/0278631 A1* | 10/2013 | Border | G02B 27/017 345/633 |
| 2013/0290096 A1* | 10/2013 | Lizotte, III | G06Q 30/0246 705/14.45 |
| 2013/0332530 A1 | 12/2013 | Yokoyama et al. | |
| 2014/0118343 A1* | 5/2014 | Takami | G06T 15/00 345/419 |
| 2014/0241625 A1 | 8/2014 | Suzuki | |
| 2015/0074506 A1 | 3/2015 | Dunn et al. | |
| 2015/0199560 A1* | 7/2015 | Gokturk | G06F 16/583 382/195 |
| 2016/0360160 A1* | 12/2016 | Eizenberg | G06Q 30/0207 |
| 2017/0293950 A1* | 10/2017 | Rathod | G06Q 30/02 |

FOREIGN PATENT DOCUMENTS

| | | |
|---|---|---|
| JP | 2013254305 A | 12/2013 |
| JP | 2014164656 A | 9/2014 |
| JP | 2016004292 A | 1/2016 |
| TW | 201640280 A | 11/2016 |
| WO | WO 2004095858 A1 | 11/2004 |
| WO | WO 2009117350 A2 | 9/2009 |
| WO | WO 2015047599 A2 | 4/2015 |

* cited by examiner

METHOD AND SYSTEM FOR REMOTE MANAGEMENT OF VIRTUAL MESSAGE FOR A MOVING OBJECT

BACKGROUND OF THE INVENTION

1. Field of the Invention

The present invention is generally related to a remote management technology for a virtual message, and in particular to a method providing a remote management interface for a user to select a moving object and set up the virtual message remotely using a computer device, and a system implementing the method.

2. Description of Related Art

According to a conventional application, a user utilizes a mobile device to execute a proprietary application, e.g. an app, for activating a camera module. The camera module is driven to capture a real scene, and the real scene is displayed on a screen of the mobile device. The application enables an augmented reality technology that allows an image object to be shown in the real scene.

In general, the augmented reality technology requires a software routine to recognize a marker within the real scene through the camera module of the mobile device. The marker is referred to in order to initiate the image object. The augmented reality technology uses a well-defined correlation between the marker and the image object to show the image object in the software routine.

Another conventional augmented reality technology relies on location-based information to initiate the image object. This means that the image object defined in the software is initiated based on a location of the mobile device. A user manipulates the mobile device to find and display the image object based on its location that is rendered by a global positioning signal generated by a GPS module installed in the mobile device. In the meantime, an azimuth angle signal can be generated by a gyroscope of the mobile device for positioning an elevation angle of the mobile device. This positioning information acts as reference provided for a server that directs the software program in the mobile device to show the image object.

These mentioned technologies of augmented reality or location-based method merely create a circumstance that allows the user to experience reality and facilitate recreation. Furthermore, in the conventional technology, an advertiser can purchase advertisements in a search engine provider for affecting a search result ranking. The advertiser can also provide a relevant advertising to a content searcher.

Nevertheless, the conventional technology has yet to provide any open platform for users to set up an image object over a moving object, the image object being a virtual image searchable to the public using an augmented reality technology.

SUMMARY OF THE INVENTION

The present disclosure is related to providing a method and a system for remote management of a virtual message associated to a moving object. The remote management system provides a remote management interface. The remote management interface can be implemented by a web browser or a proprietary software program that allows a user to remotely set up the virtual message associating to one or more moving objects. Through the system, it is not necessary for the user to be in the vicinity of a target moving object, but the user can remotely set up the virtual message associated to one of the moving objects. The moving object can be a person, a vehicle or any moving thing with specific image features. The remote management system provides information of a plurality of registered moving objects, and a database that records image information of the moving objects, and the virtual messages associated to the moving objects. The database also records configuration data such as a viewable range, a user range and/or a time period with respect to every virtual message. The virtual message can be a text, a picture, a video, a sound, or a combination thereof.

In a process of the method for remote management, a user logs on to a server, and the server initiates a remote management interface allowing the user using a computer device to select one or more moving object for setting up a virtual message over a network. The server receives the data of the virtual message associated to the moving object through the remote management interface. The server also receives searching criteria corresponding to the virtual message. Therefore, in the server, the one or more moving objects, the virtual message associated to each of the moving objects, and the searching criteria corresponding to the virtual message are created in the database.

When the data of the virtual message has been set in the remote management system, any user can search the virtual message over the moving object. A software program running in a mobile device is used to receive an image of a moving object. Through an image processing process, image information of the image of the moving object can be obtained. In the meantime, the mobile device generates positioning information related to the moving object. The positioning information is mainly a ground-position data that renders a distance relationship between the mobile device and the moving object. The positioning information with respect to the virtual message includes the ground-position data and the image information. The positioning information is uploaded to the server of the remote management system. When compared with the database of the server, a search result that matches the searching criteria and corresponds to the positioning information can be obtained. The virtual message in the search result can be displayed on the mobile device.

The virtual message can be displayed with its associated moving object on the mobile device, i.e. the moving object is overlapped by the virtual message based on the search result.

According to one embodiment, the remote management system includes a cloud server and a database, and also a computer sequence that performs the method for remote management in the server. By the computer sequence, a remote management interface is provided, and a virtual message transmitted through the remote management interface is received over a network. The server also receives a moving object selected through the remote management interface, and a correlation between the moving object and the virtual message is therefore established. After that, positioning information for searching the virtual message over the moving object can be obtained. The positioning information is such as the image information of the moving object, and a distance relationship between the moving object and the user who searches the virtual message.

Next, the server receives searching criteria associated to the virtual message, and forms the criteria for searching the virtual message. The server checks if the searching criteria of the virtual message are restricted to a specific display time, user or viewable range. A search engine is established in the server.

DETAILED DESCRIPTION OF THE PREFERRED EMBODIMENTS

The present invention will now be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The disclosure is related to a method and a system for remote management of a virtual message associated to a moving object. The remote management system includes a cloud system, and a computer sequence rendering the remote management for the virtual message. The method allows a user using a terminal computer to access a remote management system. For example, through a web browser or a proprietary software program running in a terminal computer, the user can create a virtual message, select a moving object associated to the virtual message, and arrange the virtual message by the system. The user can thereby set up a viewable range and searching criteria of a virtual message associating to a plurality of moving objects.

The remote management system renders a remote management interface provided for any user to register a moving object and as well set up a virtual message. A searchable database can be built, and a search engine is therefore established. The search engine allows the user to search the virtual message according to a captured moving object.

The following diagram schematically shows a circumstance describing the method that a user uses a mobile device to create a virtual message onto a moving object.

Figure 1A:
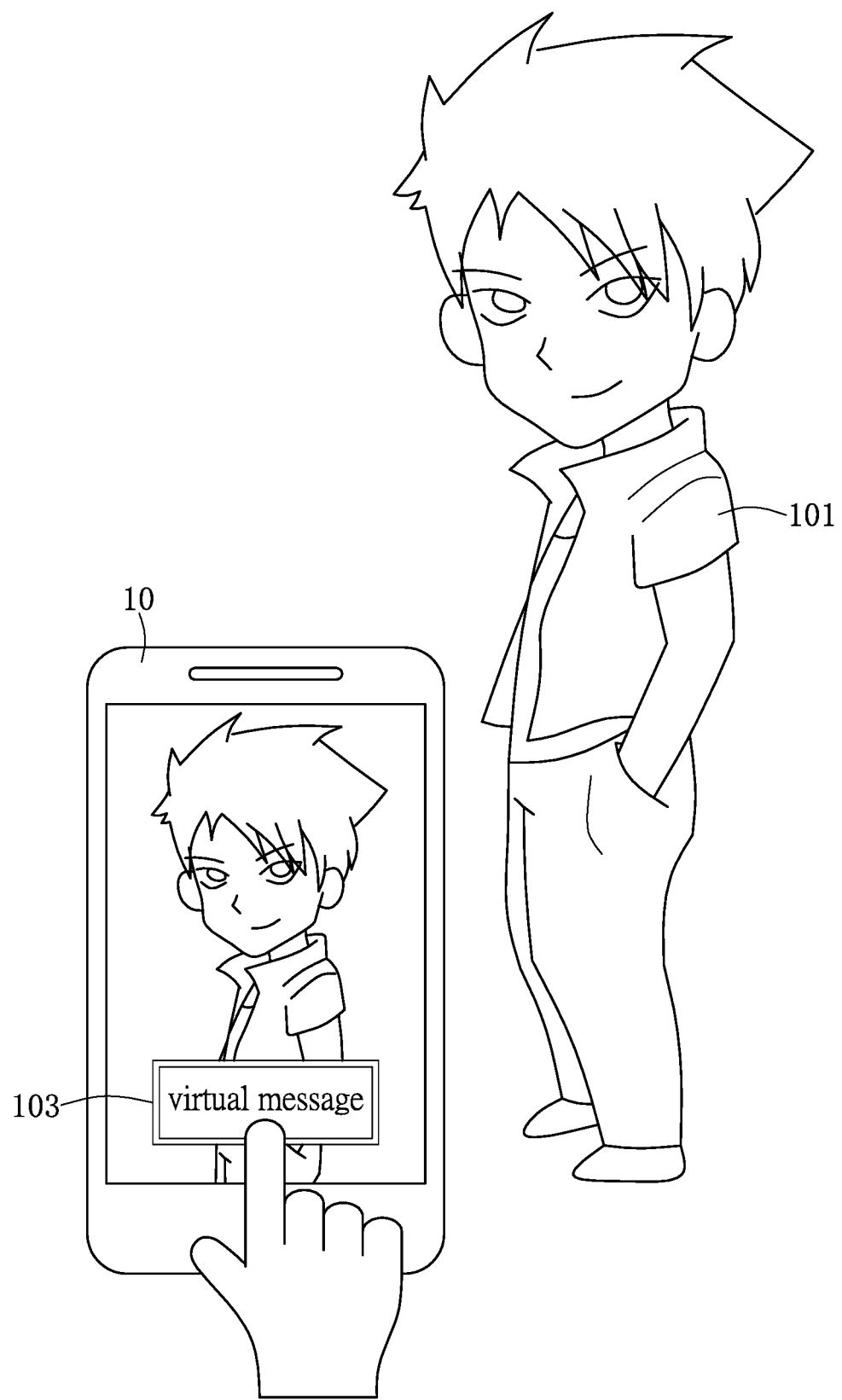
FIG. 1A and FIG. 1B show a schematic diagram depicting a scenario where a user uses a mobile device to create a virtual message onto a moving object.

In FIG. 1A, the diagram schematically shows a user manipulating a mobile device 10. The mobile device 10 can be any portable device such as a smart phone, a tablet computer or a glasses-type intelligent device that is able to capture an image of a real scene, generate positioning information and have the capability of computation.

In the beginning, the user uses the mobile device 10 to download and install a software program provided by a system. The software program is such as an app installed in an intelligent device. When the software program is executed in the mobile device 10, the software firstly enters a data-construction mode. A camera module of the mobile device 10 is then activated. The mobile device 10 manipulated by the user is directed toward a moving object 101 where a virtual message 103 is configured to be annotated to. An image of the moving object 101 is then captured. The moving object 101 is exemplified as a person shown in the diagram in the current example. The moving object can also be a car or an aircraft. For annotating the virtual message 103 onto the moving object 101, the moving object 101 can be first displayed on a screen of the mobile device 10 when the mobile device 10 is directed toward the moving object 101. In the meantime, a technology of augmented reality (AR) can be used for allowing the user to input the virtual message such as a text, a picture, a video, a sound, or any combination thereof. Any input method, such as a touch gesture for a touch-sensitive display of the mobile device 10, or an air gesture for a glasses-type intelligent device, can be used to conduct the input. The virtual message is a new message added onto the moving object 101. The aforementioned system providing the user to create and search the virtual message can be a same system as the remote management system of the present disclosure, or a different system under a same platform.

The moving object 101 is exemplified as the person shown in the diagram. In an exemplary example, when the person's attire is identifiable enough, the user may be attracted to place the virtual message 103 on his body or any area around him. For example, the virtual message 103 that is configured to be placed on the person may be an advertisement, a special offer, or a message specified to an individual person or a group of people. The user manipulates the mobile device 10 to point toward the moving object 101, and places the virtual message 103 that is instantly displayed on the screen of the mobile device 10 on the moving object 101.

When the user confirms that the virtual message 103 has been annotated onto a position of the moving object 101, the software program executed in the mobile device 10 transmits the image information of the position of the moving object 101 corresponding to the virtual message 103 to the server of the system. The image information uploaded to the server can include information of color blocks and/or lines that acts as a reference to position the virtual message 10. Further, the data uploaded to the server includes the ground-position data and/or spatial angle data of the mobile device 10 at the moment the virtual message 103 is created. The ground-position data is such as the location data sensed by a GPS in the mobile device 10. The spatial angle data is such as a combination of an azimuth angle and/or an elevation angle sensed by a gyroscope of the mobile device 10. It should be noted that the instant positioning information of the mobile device 10 may derive a viewable range of the virtual message 103.

Secondly, the software program enters a search mode. The image information of the moving object 101 can be the color block data and/or the line data between the color blocks of the moving object 101 associated to the virtual message 103. It should be noted that the search mode can be performed by another software program executed in the mobile device 10. The color blocks extracted from the moving object 101 are formed by the cloth patterns of the clothing of the person. The positioning information of the mobile device 10, and the color block data and/or line data of the moving object 101 render the references for displaying the virtual message 103. The aforementioned information can be stored to the cloud server of the application system. The image information of the moving object 101 defines the position of the virtual message 103. Once the mobile device 10 generates these references and uploads them to the cloud server, the cloud server will query the database by comparing the data. The virtual message 103 can therefore be found. In general, the ground-position data and the image information, e.g. the color blocks and/or lines, are the requisite information for the server to find the virtual message 103. A search result will be finally produced and sent to the mobile device 10.

One of the parameters of the viewable range associated to the virtual message 103 is a distance between the mobile device 10 held by the user and the moving object 101. This distance between the mobile device 10 and the moving object 101 can be determined by a proximity sensor of the mobile device 10, or through the image information. Further, the positioning information of the moving object 101 and the positioning information of the mobile device 10 can define the distance there-between. For example, a person registers the moving object 101 to the application system. The user, rather than the person, creates the virtual message over the moving object 101. Accordingly, the application system can obtain both the account information of the user who uploads the virtual message and the account information of the person, i.e. the moving object 101. The system can determine if the user falls within the viewable range associated to the moving object 101 according to the locations of both the moving object 101 and the mobile device 10. This computable distance between the moving object 101 and the user's mobile device 10 acts as a basis to determine if the user can see the virtual message 103.

In one embodiment, the moving object 101 can be a person. The person's face can provide important data for recognizing the person in addition to the above-mentioned color block data and/or line data associated to the moving object 101. The facial features can be registered in the system. Under the data-construction mode in the current example, when the user sets up the virtual message 103 on an area of the person, the mobile device 10 can be used to capture an image of the face. The software program is used to extract the image information from the face through a computation process. The image information is registered to the system when it has been transmitted to the server of the system. The image information of the face acts as one of the references allowing the other users to search the virtual message 103 under the search mode.

The mentioned color block data, line data, and/or the image information for recognizing the face of the person (the moving object) are provided for the server to conduct recognition for obtaining the virtual message associated to the moving object 101. According to one embodiment of the disclosure, in the server, an image recognition process applying a deep-learning artificial intelligence is used to process the image information of the moving object 101. The image information of the moving object transmitted by the mobile device 10 to the server is used to recognize the moving object through a computation process.

Further, when the user uses the mobile device 10 to display the virtual message 103, the software program renders an interface acting as a link icon that allows the user to click for obtaining more information relating to the virtual message 103. It should be noted that the virtual message 103 itself can also be a link button for the user to acquire more information. Further information behind the link icon is provided by the system. Alternatively, the information may be already included in the virtual message 103 when it is created. For example, the virtual message 103 can be an advertisement that allows the user to click for obtaining further introduction to a product, directions to a store, or a promotional sale and special offer. The virtual message 103 can be a personal message that only permits a specific user or group to see.

Figure 1B:
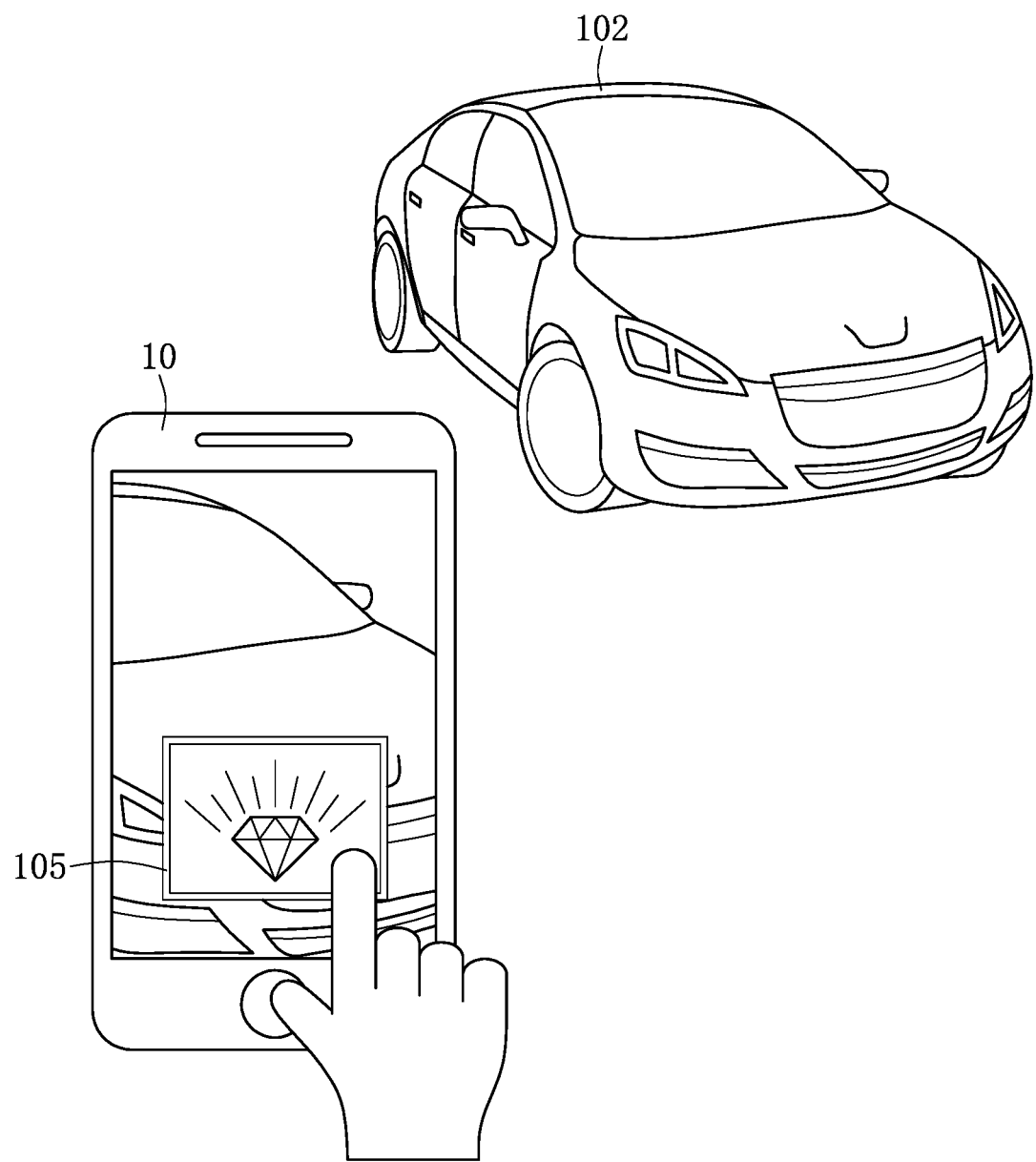

FIG. 1B shows a schematic diagram depicting a circumstance that a virtual message is created on a moving object.

The user uses the mobile device 10 to initiate the software program. Under the data-construction mode, a camera module is activated. The user manipulates the mobile device 10 towards a moving object 102, e.g. a car in the current example. In the meantime, a virtual message 105 is accurately overlapped with the moving object 102 at a specific position through a technology of augmented reality (AR). The virtual message 105 in the current example is a picture that conveys advertisement content. The virtual message 105 can be a text, a video or a picture that is used to introduce a product. In addition to uploading the data of the virtual message 105, the image information relating to the position where the virtual message 105 is placed is also uploaded to a server. For example, the image information of the moving object 102 shown in the diagram is the color block data and/or the line data between the color blocks of the painting of the car that acts as the background of the virtual message 105. When the virtual message 105 has been created, the positioning information generated by the mobile device 10 may form the reference for searching the virtual message 105. However, the positioning information of the mobile device 10 can be ignored since it is merely an auxiliary data for positioning the virtual message 105.

In an exemplary example, sometimes when the moving object 102 is indoors, the software program executed in the mobile device 10 cannot obtain the positioning data. Under this circumstance, in addition to drawing aid from assisted positioning scenarios utilizing various indoor wireless signals, the virtual message 105 can also be determined based on only the image information uploaded by the mobile device 10. Therefore, this scheme allows the virtual message 105 to be determined even when the system fails to obtain the positioning information of the mobile device 10.

Furthermore, when the virtual message 105 has been created, the user can give the virtual message 105 more functionalities. For example, the user sets up a link, e.g. URL, to the virtual message 105 that allows the other users to acquire further information that may relate to this virtual message 105 when searching the virtual message 105. The link can be used to link to another webpage for further interaction. The link can provide the interaction service that renders an interface for video conference, messaging, or shopping.

Still further, in addition to the ground-position data provided as a basis for searching the virtual message, a spatial angle data generated by the mobile device may also be one further basis for searching. In an exemplary example, the virtual message can be placed at an elevation angle with respect to the moving object due to a height of the moving object. The viewable range associated to the virtual message may include a spatial angle.

Figure 2A:
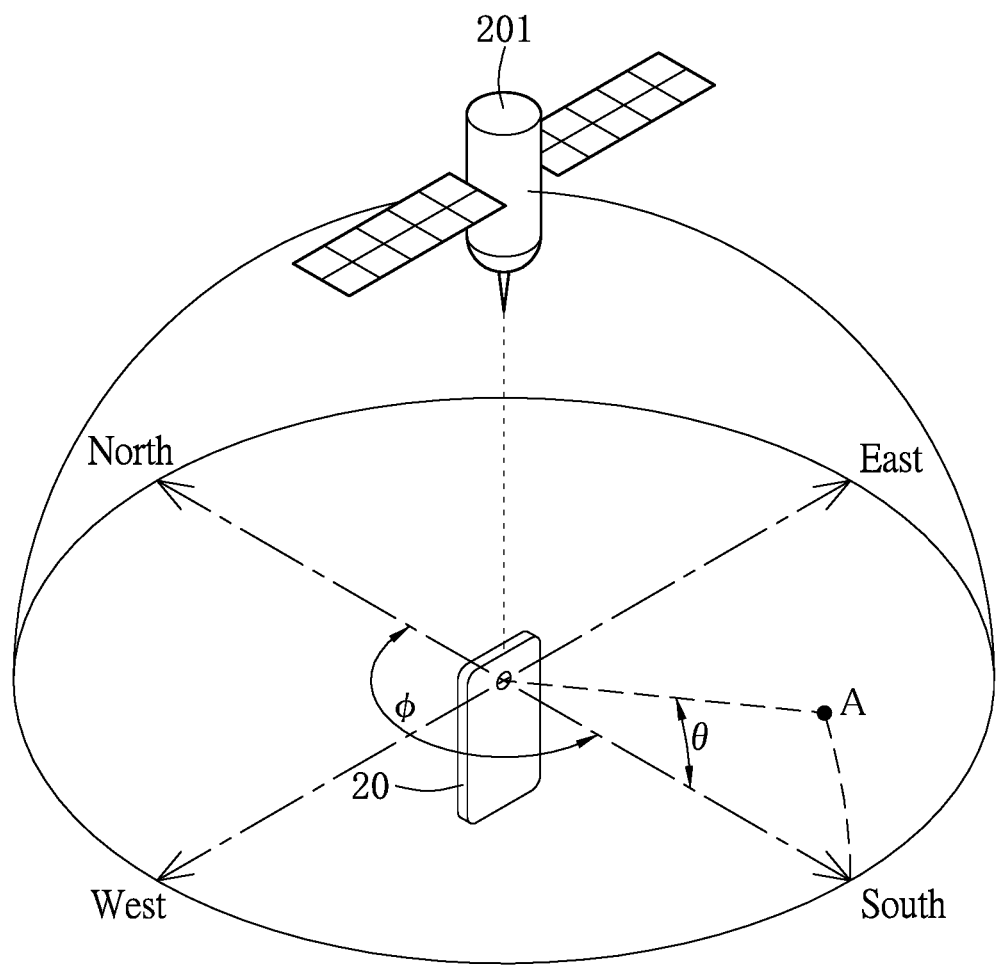
FIG. 2A shows a schematic diagram depicting coordinates indicating a space-angle data.

The schematic diagram shown in FIG. 2A depicts the formation of the space-angle data. A spatial coordinate system can be exemplarily defined by a pair of an azimuth angle $\varphi$ and an elevation angle $\theta$. The azimuth angle $\varphi$ is especially an angular measurement of a spherical coordinate system. In one aspect of the present invention, the mobile device 20 renders the spatial coordinate system. An origin of the spatial coordinate system indicates a position where the mobile device 20 held by the user, e.g. an observer, is located. The horizontal plane develops the spherical coordinates for defining the azimuth angle $\varphi$ ranging from 0-degree angle (direction of North), 90-degree angle (direction of East), 180-degree angle (direction of South), 270-degree angle (direction of West), and to 360-degree angle (back to direction of North). The azimuth angle can be described based on a reference axis, e.g. the North axis, for defining an azimuthal direction of the mobile device 20. For example, the direction A that a rear camera of the mobile device 20 points toward indicates the azimuthal direction. This direction A constitutes the azimuth angle $\varphi$ and the elevation angle $\theta$. Both the azimuth angle $\varphi$ and the elevation angle $\theta$ can be determined by a space-positioning unit in the mobile device 20. A combination of the azimuth angle $\varphi$ and the elevation angle $\theta$ forms the space-angle data for the direction A. When this space-angle data is combined with the ground-position data generated in the mobile device 20 through the positioning satellite 201, the mobile device 20 can be positioned by its position and pointing direction. A kind of positioning information is therefore formed. The positioning information is provided to the application system for obtaining a virtual message that is displayed on the mobile device 20 through an operation procedure. It should be noted that the horizontal azimuth angle $\varphi$ may not be critical positioning information since the system may not predict in advance a location relationship between the user and the moving object when the user manipulates the mobile device to search the virtual message over the moving object.

Figure 2B:
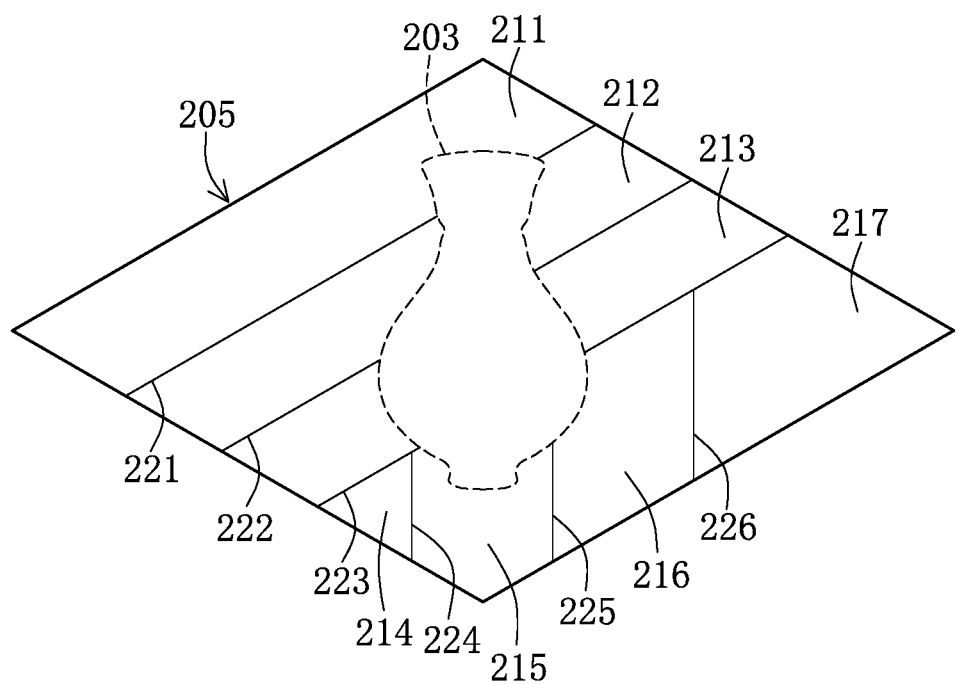
FIG. 2B shows a schematic diagram retrieving image information relating to a background of the virtual message.

FIG. 2B shows a schematic diagram depicting a technique to obtain the image information with respect to a virtual message. A virtual message 203 indicated by a dotted-line frame in the diagram is positioned over a background image 205, e.g. a moving object as recited in the present disclosure. When the virtual message 203 has been created, the server acquires information relating to the virtual message 203 from the mobile device at the user end. The information relating to the virtual message 203 includes an image of the virtual message 203, and its positioning information such as a ground-position data and a space-angle data. The image information of the background image 205 can also be acquired by the server. The positioning information, optionally with the image information of the background image 205, constitutes the parameters of positioning information for locating the virtual message 203. Further, more information can be annotated to the virtual message 203. For example, a hyperlink can be annotated to the virtual message 203 that allows a user to acquire further information when searching the virtual message 203. The hyperlink is clickable to link a webpage or a shopping interface for further interaction.

The image information of the background image 205 can be composed of a color block data and a line data through an image processing process. In one embodiment, the image processing process can be performed using a software program executed in the mobile device, or in the cloud-based server. The image processing process extracts the characteristics such as the color blocks and the lines therebetween from the background image 205. Both the color blocks and the lines act as the parameters for locating or identifying the virtual message.

In an exemplary example, the pre-processing method first sketches the background image 205, for example, using the lines 221, 222, 223, 224, 225, and 226. The blocks 211, 212, 213, 214, 215, 216, and 217 are formed by the lines 221, 222, 223, 224, 225, and 226. After that, an average of the pixel values in every block can be computed. The average denotes a color block data with respect to every block. In one further embodiment, a normalization method can be performed onto the pixels of every block so as to compute the characteristic value of every block. The characteristic value is regarded as the block's color block data. It should be noted that the image pre-processing method is not limited to the above disclosure. The image under the pre-processing method is not limited to be within any specific chromatic space, but it can be within an RGB space, a HSV (Hue, Saturation, and Value) space, or a CMYK (Cyan, Magenta, Yellow, and Black).

It is worth noting that, the information relating to the lines 221, 222, 223, 224, 225, and 226 for the background image 205 conveys a line data that acts as the reference for displaying the virtual message 203. Through the image processing process, the virtual message 203 can be appropriately positioned on the plane, such as on an area of the moving object.

Figure 3:
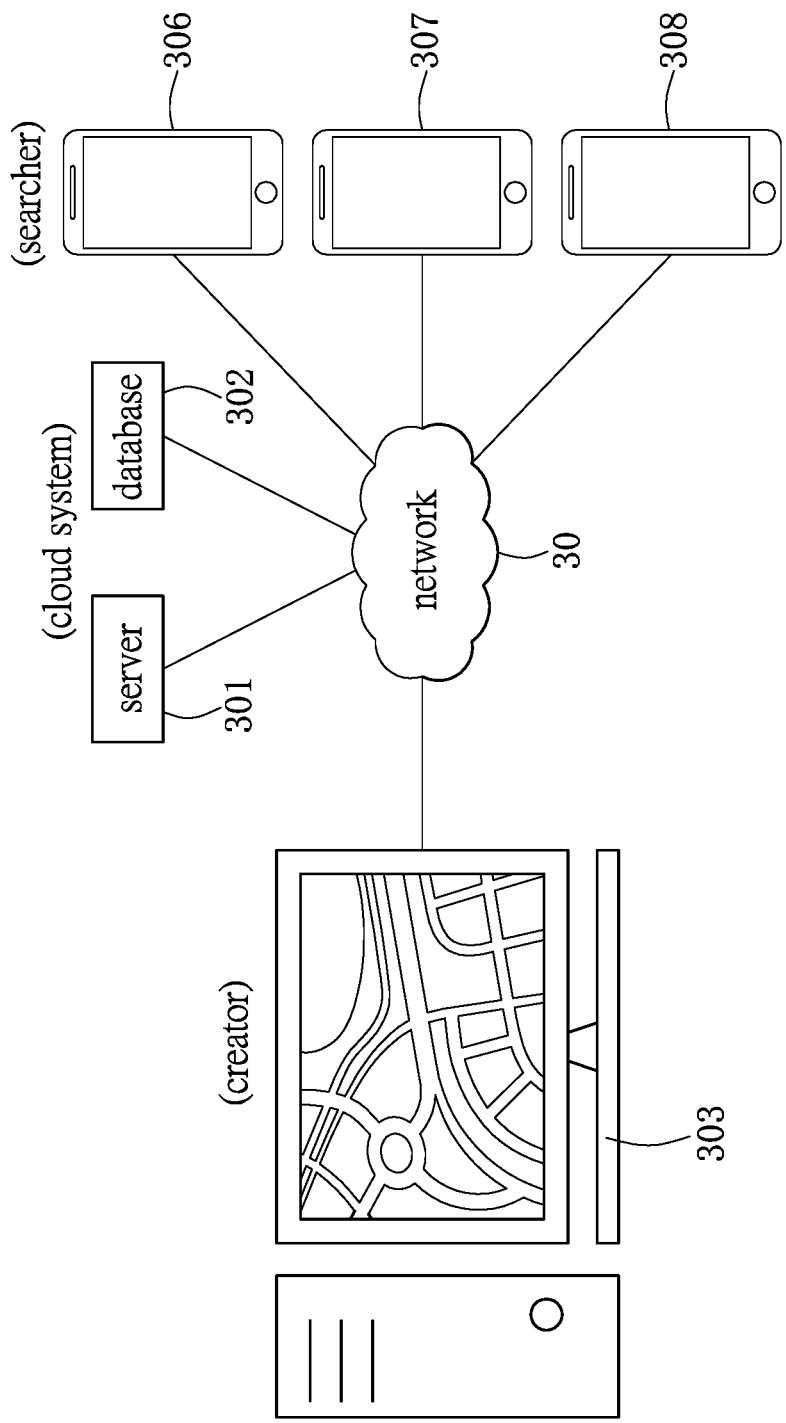
FIG. 3 shows a schematic diagram depicting a network framework of a system for remote management of a virtual message associated to the moving object according to one embodiment of the present disclosure.

Reference is made to FIG. 3, schematically depicting a network framework of the system for remote management of a virtual message onto a moving object according to one embodiment of the disclosure.

The system for providing the service of virtual message remote management can be a network-based system. A server 301 and a database 302 form a cloud system. The database 302 records multiple virtual messages and their corresponding positioning information. The positioning information is such as image information of the moving object for placing the virtual message that can be uploaded by the end user, or the system itself can also build its own data. The database 302 acts as a data source for searching the virtual message. The database 302 includes a virtual message database used to record data of the virtual message, and a search database used to record image information associated to the virtual message and searching criteria with respect to the virtual message.

The server 301 mainly processes the signals transmitted by the user-end mobile device for remote management. The signals transmitted by the user-end mobile device can be the reference used to search the virtual message. When compared with the data in the database 302, the system provides a search result. The network-based remote management system also provides the service of searching the virtual messages over a network 30. The data of the database 302 is mainly the virtual message uploaded by the terminal users. A software interface initiated in the user-end device is provided for the user to search the virtual message in the database 302.

The end users are exemplarily shown as creator devices 303 and 304. The user utilizes the mobile device to set up a virtual message onto a specific moving object by any available input method. For example, the user can utilize a touch-sensitive screen of the mobile device to set up the virtual message by a touching gesture. The user can use a glasses-type intelligent device to place the virtual message over the moving object by waving his hand. The virtual message, e.g. a text, a picture, a video, or a sound, or a combination thereof, is combined with the moving object, and the combination forms the positioning information associated to the virtual message. Further, when the remote management is in operation, the creator device 303, e.g. a desktop computer, a laptop computer, or a tablet computer, initiates a remote management interface provided for the user to select one or more moving objects, or directly set up the virtual message associated to these moving objects. The moving object itself forms the image information for positioning the virtual message. The image information is such as the color block data and/or line data extracted from the moving object through an image processing process.

The creator devices 303 and 304 create virtual messages and their corresponding positioning information. The data of virtual messages are uploaded to the server 301 of the system over the network 30. The server 301 stores the data in the database 302. The system provides the searcher devices 306, 307 and 308 to search the virtual messages in the database 302 over the network 30 using the software programs installed in their mobile devices. For example, the user can utilize the mobile device to initiate the software program and activate a camera module to capture an image of a moving object. The image information associated to the moving object can be extracted. The software program obtains the positioning information such as ground-position data and/or spatial angle data generated by a positioning circuit of the mobile device. The image information and the positioning information are transmitted to the server 301. The system provides a search result when compared with the data in the database. The search result is generated based on the image information, e.g. the color block data, line data and/or facial recognition, and the positioning information of the mobile device. After that, the virtual message in the search result is displayed on the display of the mobile device.

It is worth noting that the system receives the data of the virtual message and the corresponding positioning information from the creator devices 303 and 304 through the software program. The positioning information can be the image information of the moving object. The searching criteria for searching the virtual message can be provided by the application system or the end user. The searching criteria provided by the creator device 303 or 304 is based on a spatial relationship between the creator device 303 or 304 and the moving object. The searching criteria associated to the virtual message can be one of a time period, a viewable range and a user range, or any combination thereof.

For example, when the virtual message is created, a relation of a distance or an elevation angle between the user who searches the virtual message and the moving object can be configured in advance. A viewable range is therefore formed. The viewable range indicates a distance range or an angular range from the moving object for seeing the virtual message. The system sets up a distance threshold that is used to determine if the searcher device 306, 307 or 308 can see the virtual message associated to the moving object. If the distance difference between the searcher device 306, 307 or 308 and the moving object is outside the distance threshold, the searcher device 306, 307 or 308 cannot see the virtual message, whether due to the searcher device being too close to or too far away from the moving object.

Figure 4:
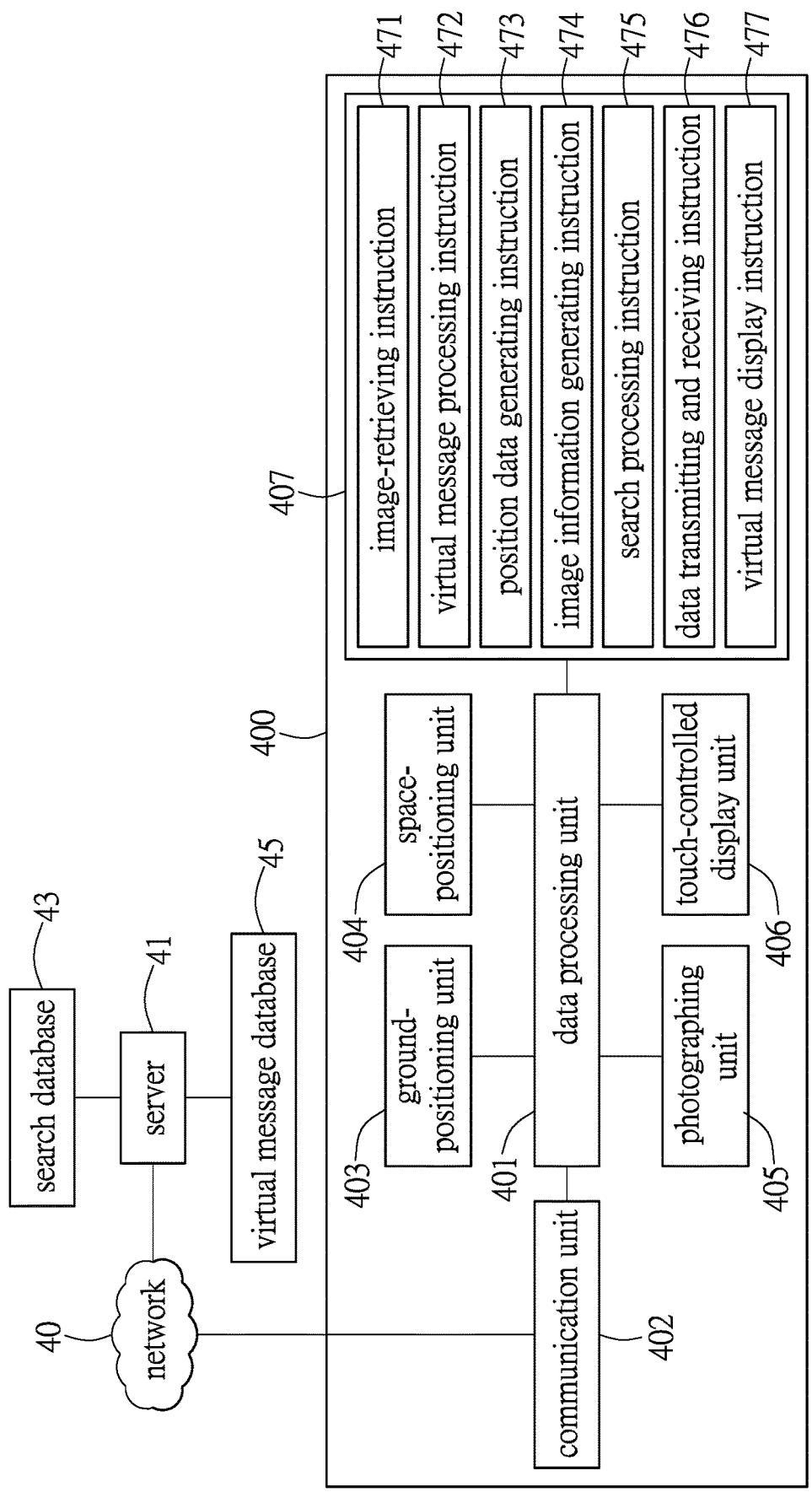
FIG. 4 shows a schematic diagram describing software modules of the mobile device in a remote management system in one embodiment of the present disclosure.

FIG. 4 shows a diagram depicting the software modules of the cloud system and the mobile device respectively in one embodiment of the present disclosure.

The system includes a cloud-based server 41. The server 41 is implemented by a computer system, or a cluster of multiple computer systems for operating various functions. The server 41 is mainly used to receive the data including a virtual message and is associated to positioning information uploaded through the remote management interface so as to establish a database. The remote management interface can be embodied by a program executed in the mobile device 400. Establishment of the database can be based on a search database 43 and a virtual message database 45. The database is used to record the data generated by the user-end mobile device, especially the positioning information associated to the virtual message.

The database is such as a data storage medium that can be divided to the search database 43 and the virtual message database 45. Both the databases 43 and 45 can be installed into one server, or different sites. The virtual message database 45 mainly records the data of the virtual message uploaded by the mobile device 400. The virtual message can be any type or any combination of a text, a picture, a video, and a sound. The video may comprehensively include a plane graphic animation or a 3D animation. The virtual message database 45 simultaneously acts as the source provided for the user to search for the virtual messages using the mobile device 400. The search database 43 mainly records further information relating to the virtual message uploaded by the mobile device 400. The information is such as the positioning information with respect to the virtual message, and/or including the color block data and line data corresponding to the scene where the virtual message is positioned. The color block data and the line data extracted from the real scene related to the virtual message act as the reference for locating the virtual message. The server 41 performs a computation procedure of comparison using the positioning information recorded in the search database 43. One or more virtual messages can be found in this preliminary procedure. Every virtual message has its identification that is recorded in the virtual message database 45 and delivered to the user-end device.

According to one of the embodiments, the computation performed in the server 41 can be an image recognition process applying a deep-learning artificial intelligence. After multiple times of processing and learning, a higher degree of recognition for recognizing the moving object can be obtained.

For example, a virtual message is established at a place correlated to a real scene, and a time period can be set. The time period acts as one of the searching criteria. The time period restricts the user to only be able to search for the virtual messages within a time period in which the seeable virtual messages also meet the other searching criteria, e.g. the positioning information and image information. The viewable range confines a seeable distance from the real scene, a viewable plane-position range and/or a viewable space-angle range allowing the user to see the virtual message. The user cannot see the virtual message until the mobile device 400 held by the user moves within the viewable range.

For example, the user can set up the time period when the virtual message is created over the moving object. The time period acts as one further criterion for searching the virtual message in addition to the image information associated to the virtual message. The virtual message is searchable when the time of search is within the time period. Further, the viewable range can be a criterion to restrict a distance range for seeing the virtual message. The user can see the virtual message that matches the image information associated to the moving object if the mobile device 400 is within the viewable range. The user range is provided to prescribe who can see the virtual message even when the virtual message matches the image information associated to the moving object. The user range acts as one of the searching criteria made by the server and is configured to permit one or more persons to see the virtual message. In this scenario, a user ID for identifying the user can be simultaneously transmitted to the server when the user utilizes the mobile device 400 to search the virtual message.

The system establishes a searching engine provided for the user to search the virtual message using the mobile device. The searching engine is based on the database including the search database 43 and the virtual message database 45 that records the data uploaded by the users.

The mobile device 400 is configured to operate the method for creating the virtual message onto the moving object, and also for displaying the virtual message. The mobile device 400 connects to the server 41 over the network 40. The mobile device 400 includes main circuit components such as a data processing unit 401 that is used to process the signals among the circuit components of the mobile device 400, and other circuits electrically connected to the data processing unit 401. The mobile device 400 includes a communication unit 402 that is used to establish a connection to an external device. A ground-positioning unit 403 in the mobile device 400 is used to sense the position of the mobile device 400. A space-positioning unit 404 is used to sense the spatial position of the mobile device 400. A photographing unit 405 is for capturing the image of a real scene, e.g. the moving object. A touch-sensitive display unit 406 allows the user to input commands using gestures.

The ground-positioning unit 403 can be implemented by the circuit component of a global positioning system that utilizes positioning signals received from a positioning satellite to generate ground-position data. The positioning scheme can be collaborated with the signals generated by other wireless base stations. The space-positioning unit 404 can be implemented by a gyroscope in the mobile device 400. The gyroscope is used to sense the spatial position of the mobile device 400 in a 3D space, so as to generate a space-angle data essentially constituted of an azimuth angle $\varphi$ and an elevation angle $\theta$.

The system includes a memory unit 407 inside the mobile device 400. The memory unit 407 is such as a non-transitory computer-readable medium that is used to store an instruction set. The instruction set executed by one or more processors of the mobile device 400 is to perform the sequences for creating and displaying the virtual message onto the moving object. The main sequences of the instruction set are as follows.

In the instruction set, an image-retrieving instruction 471 is operated to activate a photographing unit 405 of the mobile device 400 to capture an image of a moving object. If the moving object is a person, the image captured by the mobile device 400 can include a face. The face can be displayed on the mobile device 400. In the instruction set, a virtual message processing instruction 472 is operated to process the virtual message created by the user through a touch-controlled display unit 406 of the mobile device 400, in which the virtual message can be created by the user, or selected from the virtual message database 45 of the system. The data of virtual message is transmitted to the server 41. Further, a position data generating instruction 473 is used to receive the signals generated by the positioning circuit of the mobile device 400. The positioning information can be generated by the ground-positioning unit 403 and/or the space-positioning unit 404 of the mobile device 400. The positioning information generated by the GPS of the mobile device 400 is a major part of the information for positioning the virtual message. An image information generating instruction 474 is used to process the image of the moving object and generate the image information with respect to the virtual message set onto the moving object. The image information can be the color block data and/or the line data, or include the facial recognition data. A search processing instruction 475 is used to obtain the positioning information and the image information from the mobile device 400 under a search mode. The server 41 generates a search result that matches searching criteria when the server 41 receives the positioning information and the image information. A data transmitting and receiving instruction 476 is used to establish a connection between the mobile device 400 and the server 41, and to transmit or receive signals there-between. For example, the instruction 476 is operated to transmit the positioning information and the image information, and receive the search result from the server 41. When the virtual message is searched, it will be listed in the search result. Afterwards, a virtual message display instruction 477 is operated to display the virtual message which can be overlapped with the moving object that is associated to the virtual message.

The user can create a virtual message by using a software tool, a photograph, or can obtain one from the server 41. The system provides libraries such as an image library, a video library, or a sound library for the user to create the virtual message.

Figure 5:
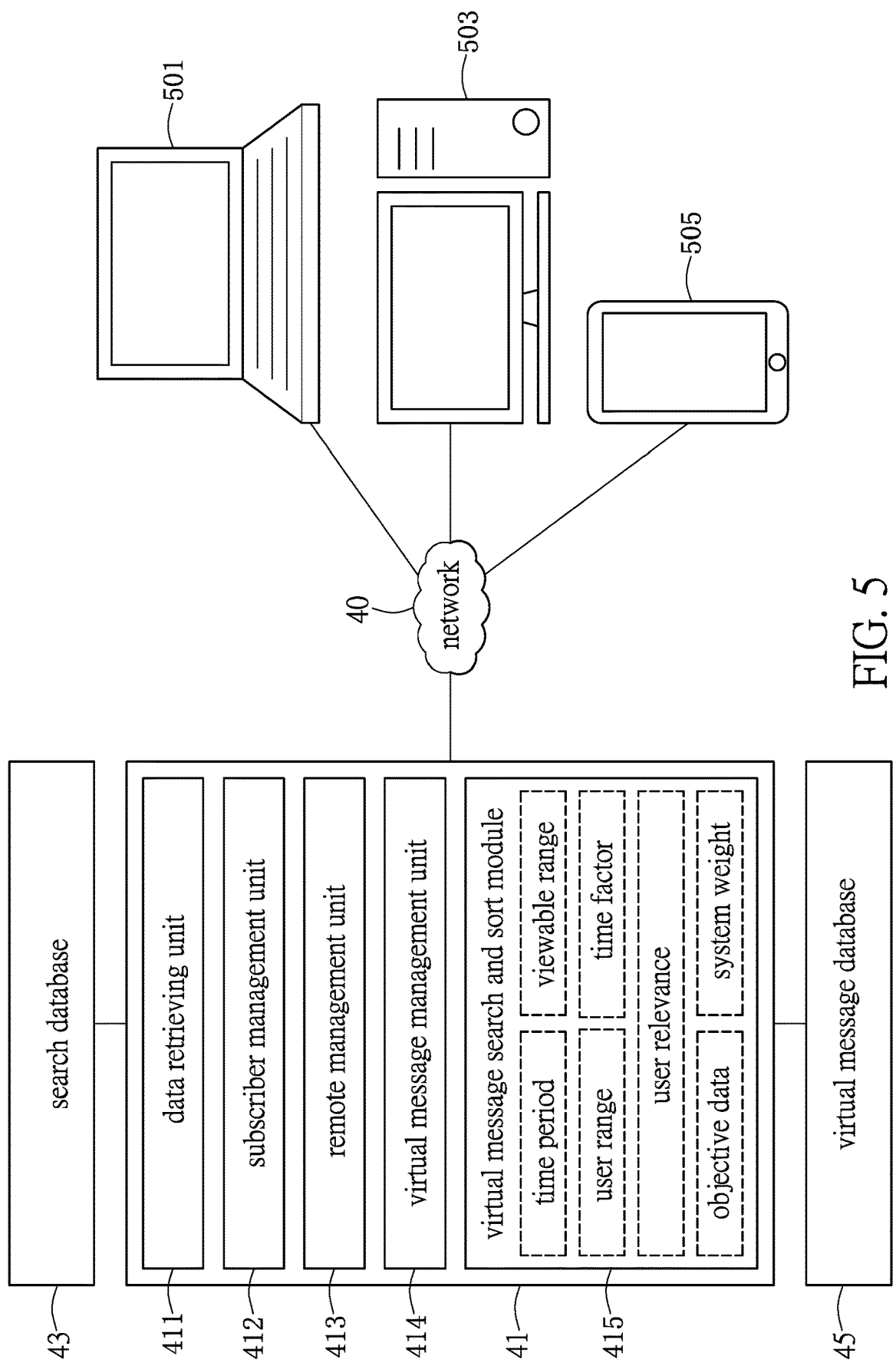
FIG. 5 shows a block diagram describing the functional modules of a server in the system for remote management of a virtual message according to one embodiment.

FIG. 5 shows a diagram of functional modules of a server of the system for remote management of a virtual message according to one embodiment of the disclosure. The server embodies a cloud system that is implemented by hardware or with software. The cloud system includes a search database 43 that records multiple virtual messages, with each virtual message corresponding to one set of positioning information, e.g. color block data and/or line data associated to the moving object. Furthermore, the ground-position data and space-angle data can also be utilized. Every virtual message has an ID acting as an index for searching. Every virtual message associated to one moving object further corresponds to individual search criteria. The search criteria include at least one selected from a time period, a viewable range, and a user range. The viewable range is such as a distance from the moving object. The user range indicates a group of users who are permitted to see the virtual message.

The virtual message database 45 of the system is used to store data relating to the virtual message. The virtual message is stored in the database in a specific form such as a text, a picture, a video or a sound, or a combination thereof. The ID of the virtual message acts as an index to link positioning information and search criteria of the search database 43 for the specific virtual message.

A server 41 is a computer system with operations made by the hardware and software and including one or more processors for performing the services allowing the end users 501, 503 and 505 to conduct remote management of the virtual message over a network 40. The server 41 is used to process the virtual message and its positioning information made by the end users 501, 503 and 505.

The server 41 includes a data retrieving unit 411 that is a circuit-based solution to achieve data retrieval. For example, a network interface of the server 41 is utilized to link to the network 40 for receiving the virtual message set up by one of the end users, and the positioning information and search criteria of the virtual message. The positioning information includes the positioning data and the information relating to the moving object. The data retrieving unit 411 initially processes the information for establishing data for searching the virtual message.

A user management unit 412 is used to manage the users of the system using a memory and a set of computer instructions. The memory is used to store the users and every end user's security data such as identification data and password. The system uses those data to establish a database for the users.

A remote management unit 413 is implemented by a service program. The remote management unit 413 links to a front-end user interface and a back-end database (43, 45). The remote management unit 413 renders a user interface provided for the remote user to set up the virtual message and the related content. The remote management unit 413 allows the end user to conduct the remote management by a specific program, e.g. a web browser or a proprietary program. The user interface initiated by the remote management unit 413 provides the end user with the option to upload the virtual message and the positioning information relating to the place where the virtual message is positioned. It should be noted that the virtual message can be a text, a picture, a video, a sound, or a combination thereof. The user interface renders an electronic map allowing the end user to select a place to set up the virtual message. The positioning information includes a space range allowing the users to see the virtual message. The viewable range includes a viewable distance range between the virtual message and the moving object associated to the virtual message. The viewable range may also include a range of spatial angle related to the moving object. A set of search criteria such as a time period and a user range can also be provided to confine the viewable range of the virtual message. The time period denotes a validity period, and the user range denotes one or more viewable users.

A virtual message management unit 414, coupled to the remote management unit 413, is used to receive the virtual message and its corresponding content such as the positioning information, image information and search criteria. The virtual message management unit 414 creates a virtual message ID associated with the virtual message that can be linked to a specific user ID. The user ID is used to identify the user. The various types of virtual messages are stored in the virtual message database 45. The information relating to the virtual message is recorded in the search database 43. The information in the search database 43 includes image information relating to the moving object, and search criteria associated to each virtual message.

In one embodiment, the system may utilize different servers to perform different works. For example, the server 41 provides remote management services for the virtual message. The system may utilize another server to conduct a searching service for searching the virtual message, in which, a virtual message search and sort module 415 embodies the function of searching the virtual message.

The virtual message search and sort module 415 is used to process the search criteria with respect to the virtual message which the user wishes to search, and to process sorting criteria of the virtual message. The mentioned search criteria are such as a time period, a viewable range, and/or a user range. The sorting criteria relate to a time factor, user relevance, objective data, and a system weight associated to the virtual message.

The virtual message search and sort module 415 is also in charge of communicating the system-end service with the software program of a user-end mobile device or computer terminal. A service sequence is used to receive the searching information generated by the mobile device and output a search result of virtual messages. In one embodiment, the service sequence compares the positioning information uploaded by the mobile device with the data in the search database 43. The system retrieves the virtual message data from the virtual message database 45 according to the search result. The virtual messages related to the search result are transmitted to the mobile device. Further, a sorting may be performed upon the search result in order to prioritize relatively interesting content to the user.

The sorting process introduces filtering criteria for the search result having multiple virtual messages. The filtering criteria cause the search result to be narrowed to a certain number of virtual messages and make the search result more meaningful.

In an exemplary example, the virtual message search and sort module 415 is operated to sort the virtual message according to user relevant information. The user relevant information is such as a user ID associated to the positioning information, e.g. the image information of the moving object. The user relevant information is retrieved by the system. The system accordingly acquires the virtual message which is designated to be viewable for a specific user or a user range. The virtual message is set up to be a personal virtual message through filtering with the user ID. The personal virtual message can be configured to be viewable only to the one or more viewable users having priority sorting. On the contrary, users being excluded outside of the user range will not be able to see the virtual message. Therefore, the system allows the user to set up the virtual message to be unavailable to certain users.

Further, the user relevant information can be a preference or historical data of the user. Still further, in the database, one or more content categorizations for the virtual message can be set through the remote management interface. The user sets up the preference in the system. The user can actively set up one or more content categorizations in the preference. The historical data includes the data related to the user collected by the system. For example, the historical data records a stay time and number of visits for the content associated to the virtual message. The system may regard the category of the content receiving longer stay time from the user as a preferred category. Similarly, the number of visits for the content of the virtual message can be used as a reference to judge the user's preference. The cloud system determines one or more preferred content categorizations according to the user's historical data.

The system prioritizes virtual messages with higher relevance to the user, and deprioritizes virtual messages with lower relevance to the user. The system accordingly provides a search result with a relevance sorting.

In one embodiment, the virtual message has a time property. A virtual message provider is permitted to set up a time factor for the virtual message. The time factor can be an available time period to show the virtual message. The available time period can be a time period or a period of time, e.g. in the morning, at the noon time, or in the evening. The available time can be an available display time period to be searched. The system filters a preliminary search result according to a system time of the server in order to exclude the virtual messages that do not match the time factor. For example, the virtual messages not within the display time period are excluded from the search result; and the virtual messages that expire prior to the system time are also excluded.

The system may sort the virtual messages according to objective data. The objective data is such as a time of creation, an update time/rate, an available time period, a click through rate, and/or user reviews associated with every virtual message. The system decides a ranking of a sorting result based on these objective data. For example, the virtual message gains higher priority when it has a later time of creation; the virtual message gains higher priority when it has a higher updating rate; the virtual message gains higher priority when it has a higher access rate; or the virtual message gains higher priority if it gains higher reviews for its content.

Moreover, besides the above-mentioned time, user relevance, and the objective data used as reference for sorting, the system can impose a system weight to every virtual message in the database. The system allows the virtual message provider to assign a weight to every virtual message. The system calculates a system weight for every virtual message according to its individual weight, and the virtual message with higher system weight gains higher ranking.

In an example, the system weight can be an advertisement. The virtual message provider can be an advertiser. The advertiser can offer a price to request a higher priority ranking for his virtual message. The price becomes one of the system weights. The system changes the ranking of the virtual messages through the system weights. The virtual messages relating to government publicity activities or public information can also be prioritized by manipulating the system weights thereof.

Through the virtual message search and sort module 415, a sorting can be decided based on the various references of sorting. The sorting scenario is adjustable according to actual needs.

Finally, the system delivers a result of searching and sorting to the mobile device which issued the request. The mobile device uses its display to show a virtual message with the highest priority when the mobile device receives one or more virtual messages from the server 41. Further, the mobile device shows a selected virtual message according to a selection instruction. The virtual message shown in the display of the mobile device is combined with the real scene captured initially.

It should be noted that the remote management system can render different functions of remote management interfaces with respect to various purposes. For example, the remote management interface acts as a user interface allowing a moving object, e.g. a person or an owner of a vehicle, to be registered in the database of the system. In particular, the image of the moving object is the subject to be registered in the system so as to form the virtual message database 45.

The system can further render another user interface for the user to set up a virtual message, including its viewable range and searching criteria, and decide one of the moving objects to associate to the virtual message. These user interfaces for different purposes are collectively the remote management interface.

Figure 6:
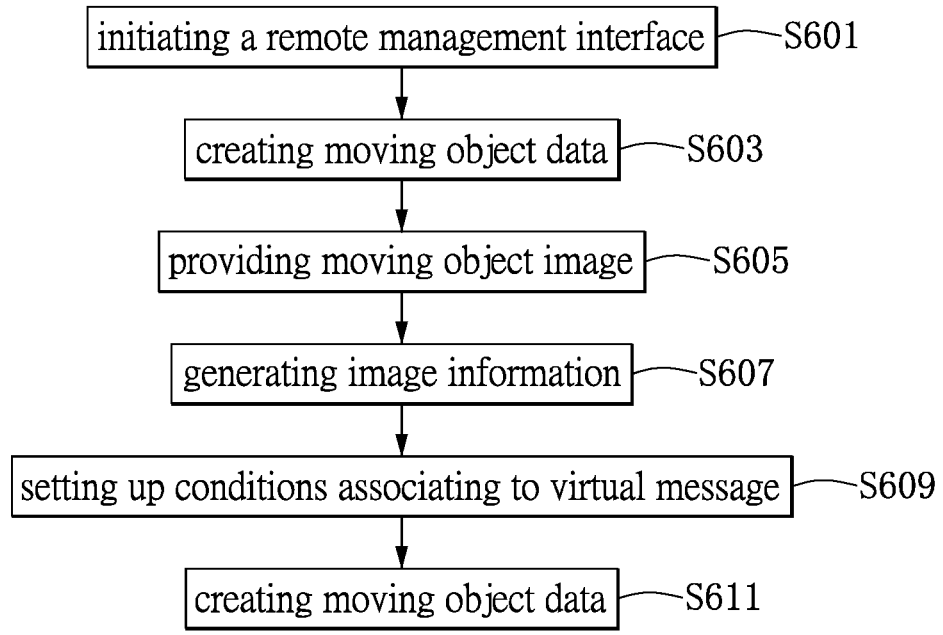
FIG. 6 shows a flow chart describing a method for remote management of a virtual message of a moving object in one embodiment of the present disclosure.

Reference is next made to FIG. 6, showing a flow chart describing the method for remote management of a virtual message associated to a moving object in one embodiment. The remote management system includes a cloud server and a database, and also a computer sequence running in the server of the system. The computer sequence is executed by a processor of the server for performing the method for remote management of the virtual message.

In the process for creating the moving object according to the embodiment, in the beginning, a user who can be an owner or a manager of a moving object logs on the remote management system using a computer terminal. After a requisite process of user authentication, in step S601, a remote management interface is initiated via a web browser or a proprietary software program. Next, in step S603, the user can create data of the moving object. For example, the user inputs information relating to the moving object through several fields rendered by the remote management interface. The information of the moving object includes a brief introduction, an area where the moving object will be located, and/or the geographic information regarding the places where the moving object often appears or doesn't. The information acts as a reference for the other users to set up the virtual messages.

Further, such as in step S605, the system requires the user to provide an image of the moving object. The user can upload an image of a front view of the moving object, or include a back view of the moving object, or any angle of view of the object. In step S607, the computer sequence in the system extracts image features from the image of the moving object by analyzing the image. The image information that is configured to recognize the moving object is therefore formed. The image information is generally the color block data and/or the line data associated to the moving object. The image information also renders the positioning information for the virtual message. For example, the moving object can be a person, and the image of his cloth, hair and/or makeup will be the information for recognizing the person. Further, when a face recognition process is applied to the person for converting a human face into image information used to position the virtual message, the facial information can be used to position the virtual message. The system applies the face recognition process to the server for configuring the moving object since the face recognition process can render available human facial image information for positioning the virtual message.

Next, in step S609, the system allows the user who can be the owner or the manager of the moving object to configure criteria associating to the virtual message through the remote management interface. For example, the user sets up a time period as one of the criteria associating to the virtual message to exclude people, e.g. the searchers, to see the virtual message associated to the moving object at a time outside the time period. Further, the user can exclude some categories that he disallows the creators of virtual messages to establish association to the moving object. For example, the user can deny categories of ads, such as erotic ads, to associate to the moving object. Still further, the user can allow or disallow the users to see the virtual message associated to the moving object at some locations through the criteria.

In step S611, the system creates the data of moving object based on the abovementioned information, the image information, and the criteria for the virtual message associating to the moving object. A virtual message database is also established. The system also allows the user to manage, e.g. remove or edit, the moving object later through the remote management interface.

Figure 7:
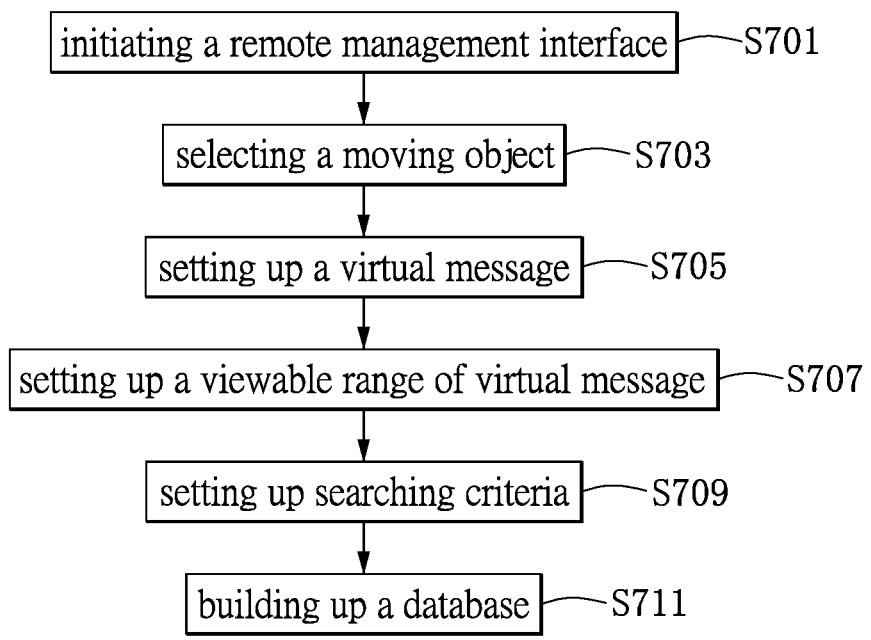
FIG. 7 shows another flow chart describing a method for remote management of a virtual message of a moving object in one further embodiment of the present disclosure.

FIG. 7 shows another flow chart describing the method for remote management in one further embodiment.

In the process, the user can remotely manage the virtual message using a personal computer, a mobile device or a tablet computer. In step S701, a remote management interface is initiated via a web browser or a proprietary software program. The user can be an advertiser, or a message publisher. The user selects one of the moving objects in the system through the remote management interface. The moving object can be a person, an animal, a car or other vehicles that may have their unique image information, such as in step S703.

The next step is to set up a virtual message. The system allows the user to produce a picture, a text, a sound or any combination thereof as the virtual message. Alternatively, the user can firstly link to a server and then select one of the virtual messages recorded in a database of the system, such as in step S705. The server of the cloud system receives the data of the virtual message and establishes a correlation between the virtual message and the image information of the moving object. Rather than a way that the user sets up the virtual message over the moving object at the place and in the vicinity of the moving object, the remote management system allows the user to remotely manage one or more virtual messages through the remote management interface. For example, through the remote management interface, the user can set up one or more virtual messages to associate to one moving object by several simple steps; or the user can set up one virtual message to associate to more than one moving object at a time. The server of the system receives the data of the virtual message and the information about the relationship between the virtual message and the moving object. The system then establishes a correlation between every virtual message and the image information that can be used to position the virtual message. Furthermore, the user can precisely position the virtual message onto a specific portion of the moving object by providing more details of image information of the moving object.

Further, the user can specify a set of searching criteria for the other users to search the virtual message. For example, the user sets up a viewable range of the virtual message, such as in step S707. In one embodiment, a viewable distance range from the moving object is seeable for the user through the remote management interface, and the user can then conveniently decide a range for other users to see the virtual message. The viewable range may include a range of angle of view, or a range of elevation angle. The viewable range restricts the other users operating their mobile devices to see the virtual message associated to the moving object only within the viewable distance range, the range of angle of view, or the range of elevation angle. Further, the user can also set up a viewable geographic range associated to the moving object in order to define the reviewable range. For example, the viewable geographic range restricts the other users to see the virtual message only when the moving object is on a road, in an administrative region, on a mountain, or on a sea. In addition to the user of the virtual message setting up the viewable range, the owner of the moving object can set up his preferred viewable distance or a viewable region.

Next, the user can configure a set of searching criteria for every virtual message, such as in step S709. The system allows the user to set up a time period, a user range, or even a budget range to make the virtual message viewable through the remote management interface. For example, if the virtual message is a message about a special offer made by a restaurant, the time period for viewing the virtual message may be restricted to the meal times of a day. The time period can be used to restrict the searchable time if the virtual message is assigned with an expiration time. The user range for the virtual message allows the user to specify a person or a group of users to see the message since the system can filter out the viewable users based on the user IDs. The virtual message can be a commercial advertisement and a price can be assigned to the virtual message. The user can set up a budget range for the commercial use. When the virtual message is read by the other users, the budget will be deducted by an amount until the budget reaches the budget limit and the virtual message is not viewable. It should be noted that the aforementioned searching criteria can be used in any combination of the foregoing. The virtual message can be more flexibly used for various purposes.

In step S711, the system receives the data of the virtual message, its associated moving object and image information, the viewable range and searching criteria. The information allows the system to establish the searchable parameters.

In one aspect, in view of the process described in FIG. 7, the moving object can be another registered user with a service account in the system. The system not only receives the user account and his positioning information, but also the service account and position associated to the moving object. It should be noted that there is also a software program executed in a mobile device of the moving object, and the software program acquires the positioning information of the mobile device. Therefore, the system can identify the moving object, e.g. another person, and any virtual message associated to this moving object according to its service account. The system can still respond to any searcher by recognizing the virtual message associated to the moving object based on the image information. The system further acquires the position of the moving object. Thus, a viewable range of the virtual message associated to the moving object can be defined. The system also obtains a distance between the user who searches the virtual message and the moving object, so as to determine if the user can see the virtual message. This difference can also be one reference for setting up the viewable range.

Figure 8:
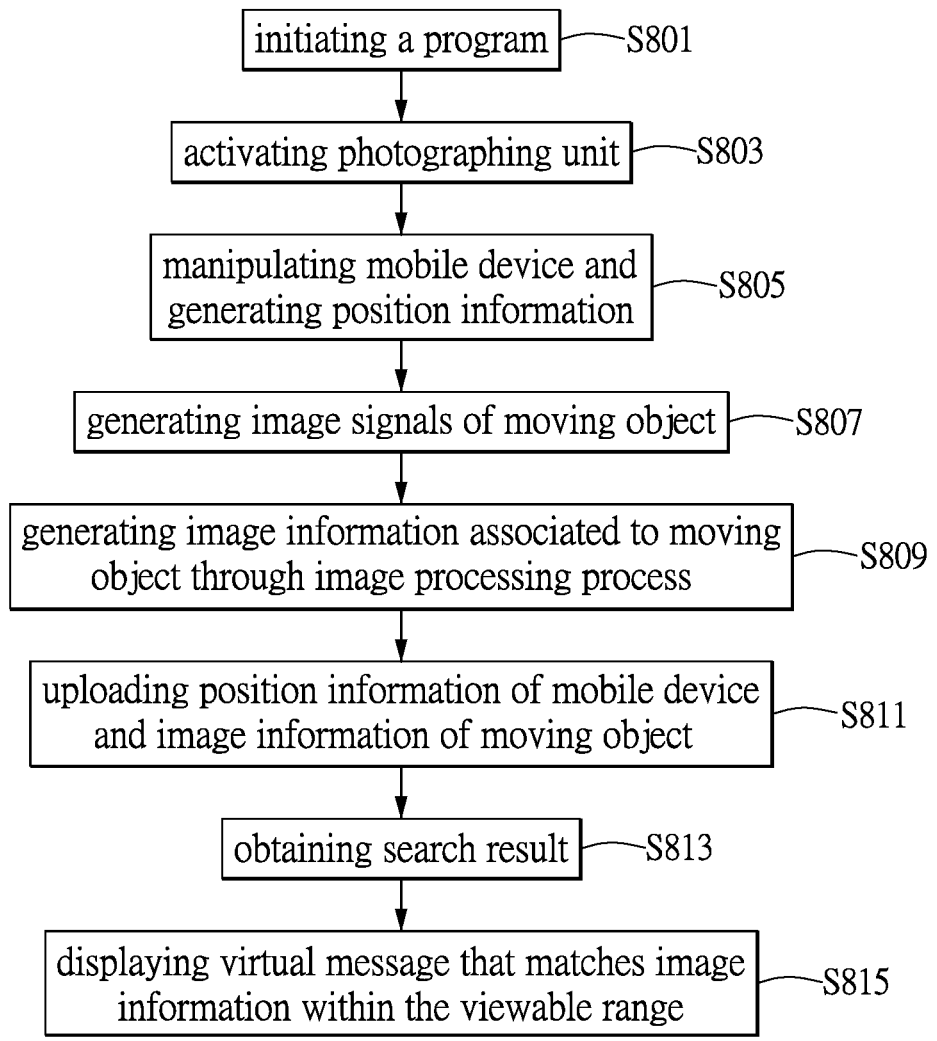
FIG. 8 shows another flow chart describing a method for remote management of a virtual message of a moving object in one further embodiment of the present disclosure.

Reference is made to FIG. 8 showing a flow chart describing the method for searching the virtual message according to one embodiment of the disclosure.

The system provides a service allowing the end user to search the virtual message, for example through a technology of augmented reality. The user can use the software program executed in his mobile device, such as in step S801. Under a search mode, the software program initiates a photographing unit of the mobile device for capturing an image of an object, such as in step S803. The object may be a moving object where a virtual message is placed. In operation, the software program continuously obtains positioning information of the mobile device, such as in step S805. The positioning information is exemplarily the ground-position data generated by a GPS module of the mobile device, and/or the spatial angle data generated by a gyroscope of the mobile device.

In addition to acquiring the image signals of the moving object, such as in step S807, the software program extracts the image information from the moving object through an image processing process, such as in step S809. The image information obtained by the software program can be the color block data and/or the line data associated to the moving object. The image information and/or the positioning information of the mobile device form the information acting as the reference to determine if any virtual message can be found. When compared with the database, any virtual message in the database that matches the searching criteria, such as the image information, can be displayed with the moving object on the mobile device. In one further embodiment, if the moving object is a person who is a registered user in the system, the positioning information generated by his handheld mobile device acts as one of the important information for positioning the moving object. A distance between the moving object and the user searching the virtual message can be obtained based on their positioning information.

It is worth noting that the image information associated to the moving object can be color block data and/or line data, and the information for recognizing a human face, e.g. facial features, can also be the important information for recognizing the moving object and positioning the virtual message if the moving object is another person. The system then provides a search result based on the mentioned image information.

The software program executed in the mobile device obtains the positioning information and the image information associated to the moving object, and then uploads the information to the server, such as in step S811. The server includes the database that is used to record the virtual messages uploaded by the users, and the corresponding viewable ranges and image information associated to these virtual messages. In the server, a computation process is performed for conducting a comparison against the database. The system can obtain a search result including the virtual message with a viewable range and image information that match a specific searching criteria, and send the search result to the mobile device, such as in step S813. Since the search result includes at least one virtual message, the virtual message that matches the viewable range and image information will be displayed on the mobile device within the viewable range, such as in step S815.

Figure 9:
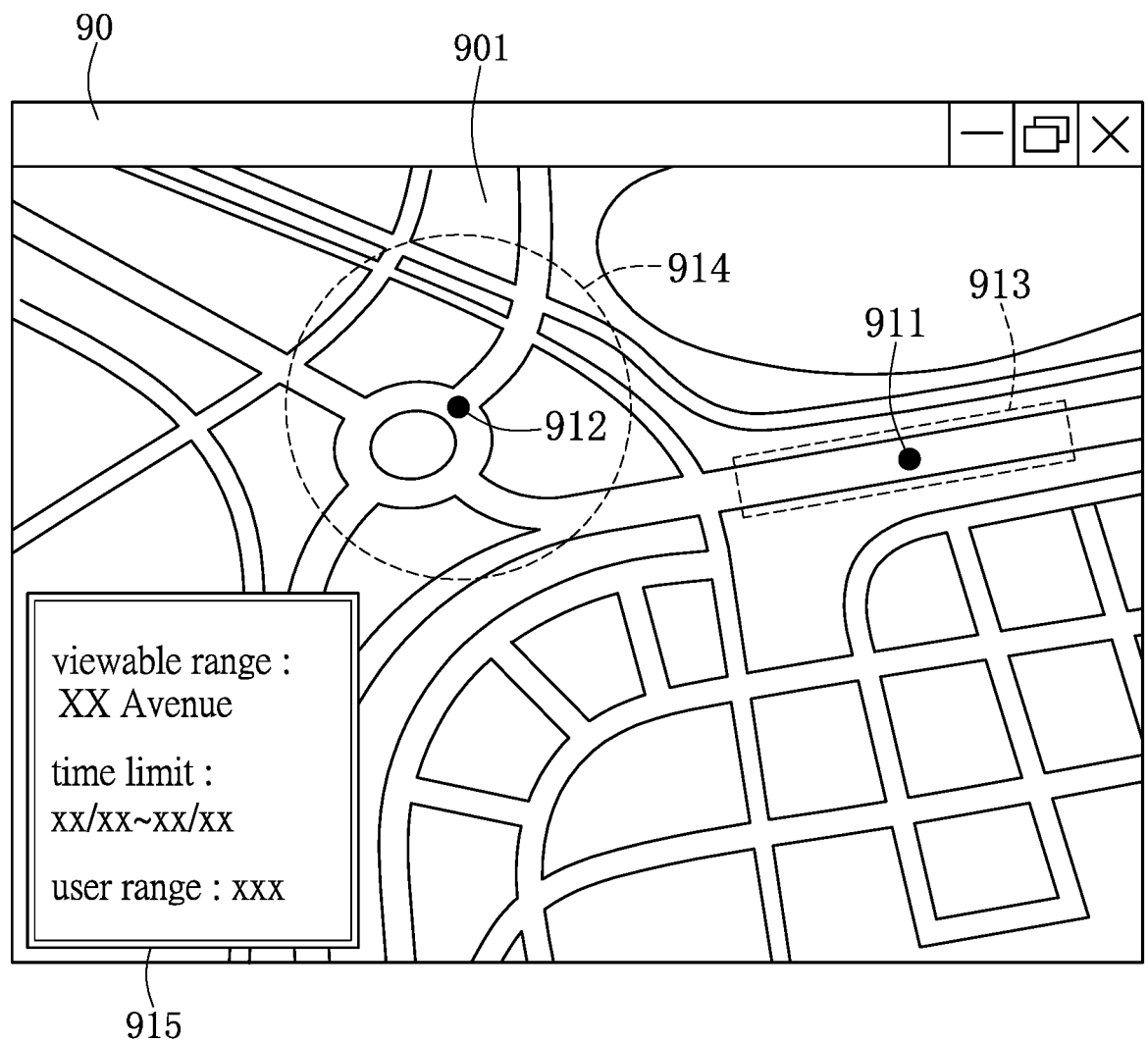
FIG. 9 shows a schematic diagram depicting a remote management interface initiated by the system according to one of the embodiments.

FIG. 9 shows a schematic diagram of a remote management interface rendered by the system for remote management according to one embodiment. In the diagram, the system provides a remote management interface 90. The remote management interface 90 can be exemplified as an electronic map that acts as a user interface for a user to conveniently set up a virtual message.

In the current example, the user decides a location via this user interface 901 for locating a virtual message. When the virtual message is configured to associate to a first moving object 911, the user can specify a first viewable range 913 relating to the first moving object 911. The virtual message is searchable or viewable only within the first viewable range 913 when it is also required to match the viewable criteria related to the first moving object 911. Further, the first viewable range 913 indicates a range of a road. The virtual message associated to the first moving object 911 is searchable only when the first moving object 911 is within the first viewable range 913. For example, an owner of a store on a road can set up a virtual message, e.g. an advertisement relating to the store, to be viewable and searchable only within a range of the road where his store is located.

The diagram shows a second moving object 912 that associates to a second viewable range 914. The second viewable range 914 exemplarily indicates a range of a radius of several hundred meters surrounding the second moving object 912. The second viewable range 914 restricts the user to only be able to see a virtual message associated to the second moving object 912 within the second viewable range 914. The second viewable range 914 is exemplified as a viewable distance range for the virtual message.

The user interface 901 may render various kinds of interfaces provided for the user to configure the moving object and the viewable range associated to the virtual message. In the current example, a searching criteria setting area 915 is provided for showing a viewable range, a time period and a user range that restrict the user to see the virtual message.

Figure 10:
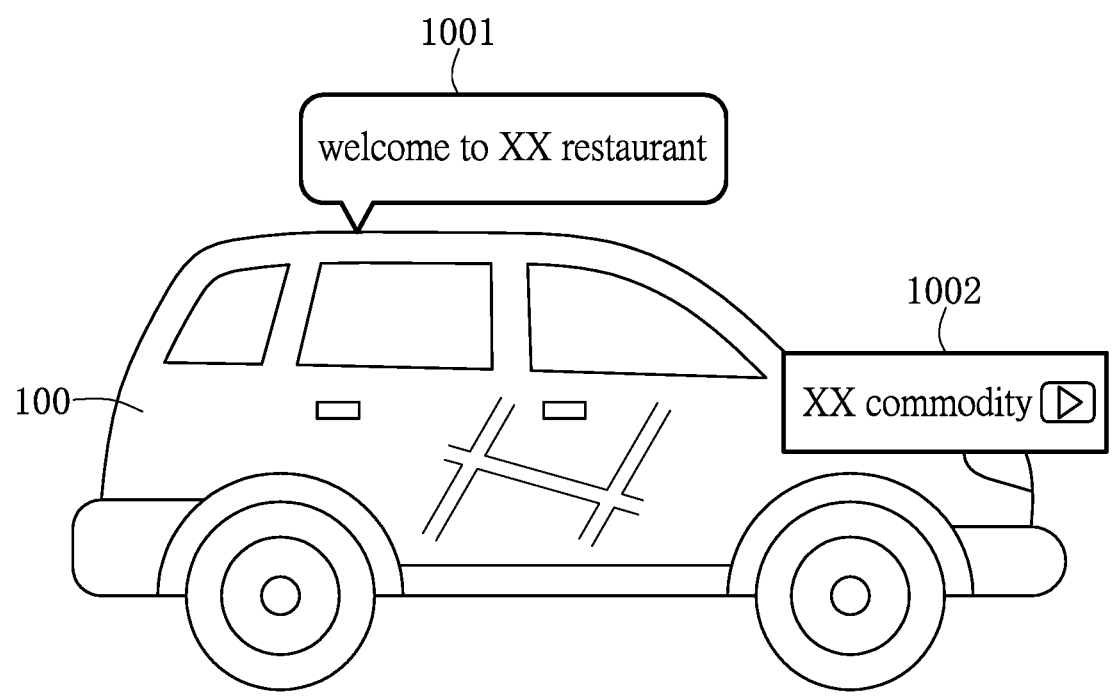
FIG. 10 shows a schematic diagram depicting a circumstance that a virtual message associated to the moving object is displayed in one embodiment of the present disclosure.

FIG. 10 shows a schematic diagram depicting a circumstance that a virtual message is displayed on the moving object.

In the diagram, a moving object 100 is exemplified as a car. More than one virtual message is displayed over the car. When a user manipulates a mobile device to capture an image of the car, the program executed in the mobile device retrieves the image signals and analyzes the image features. The image features may form a part of the information for positioning the one or more virtual messages. When the image information is uploaded to a server, the software process performed in the server conducts a comparison using a database. Finally, in the current example, a first virtual message 1001 and a second virtual message 1002 are found to be shown over the moving object 100. The first virtual message 1001 shows an advertisement message of 'welcome to XX restaurant.' The second virtual message 1002 shows a message of 'a commodity' and a related playback message.

Figure 11:
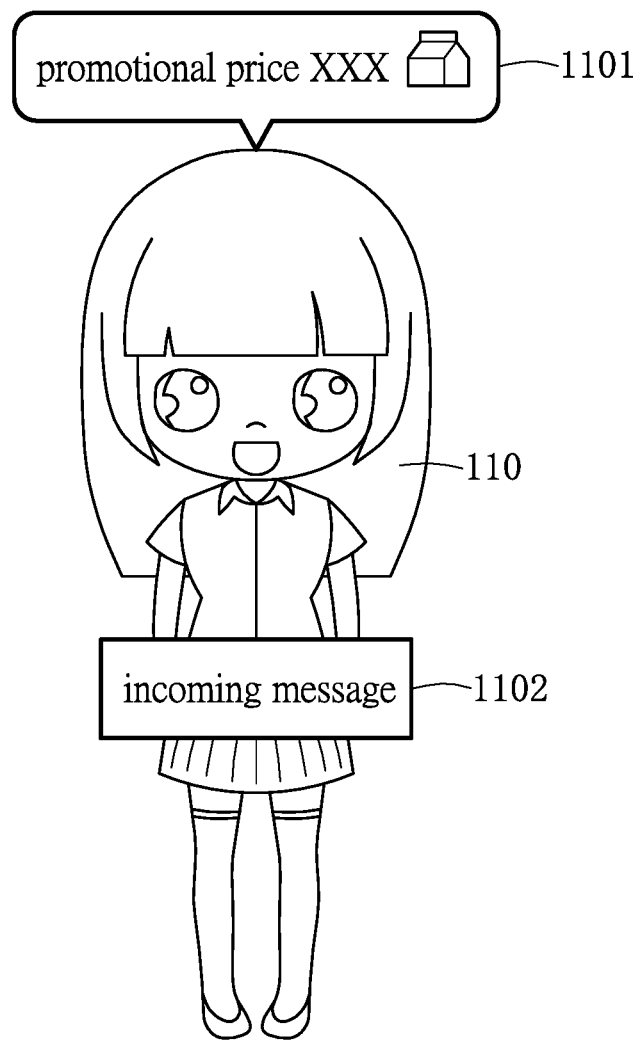
FIG. 11 shows a schematic diagram depicting another circumstance that a virtual message associated to the moving object is displayed in one embodiment of the present disclosure.

FIG. 11 schematically shows another virtual message in one circumstance. A moving object 110 is a person. There are several image features over this person, and the image features form the image information for identifying this moving object and searching any related virtual message. The image information is uploaded to the server for searching any virtual message that matches a specific searching criteria based on the uploaded image information and a corresponding viewable range. After the comparison is performed in the server, a third virtual message 1101 showing a message 'promotional price XXX' that combines a text and an icon and a fourth virtual message 1102 indicating a message of 'incoming message' are finally displayed. It should be noted that the fourth virtual message 1102 may not be a message available to every searcher but only to an individual user conducting the search.

Figure 12:
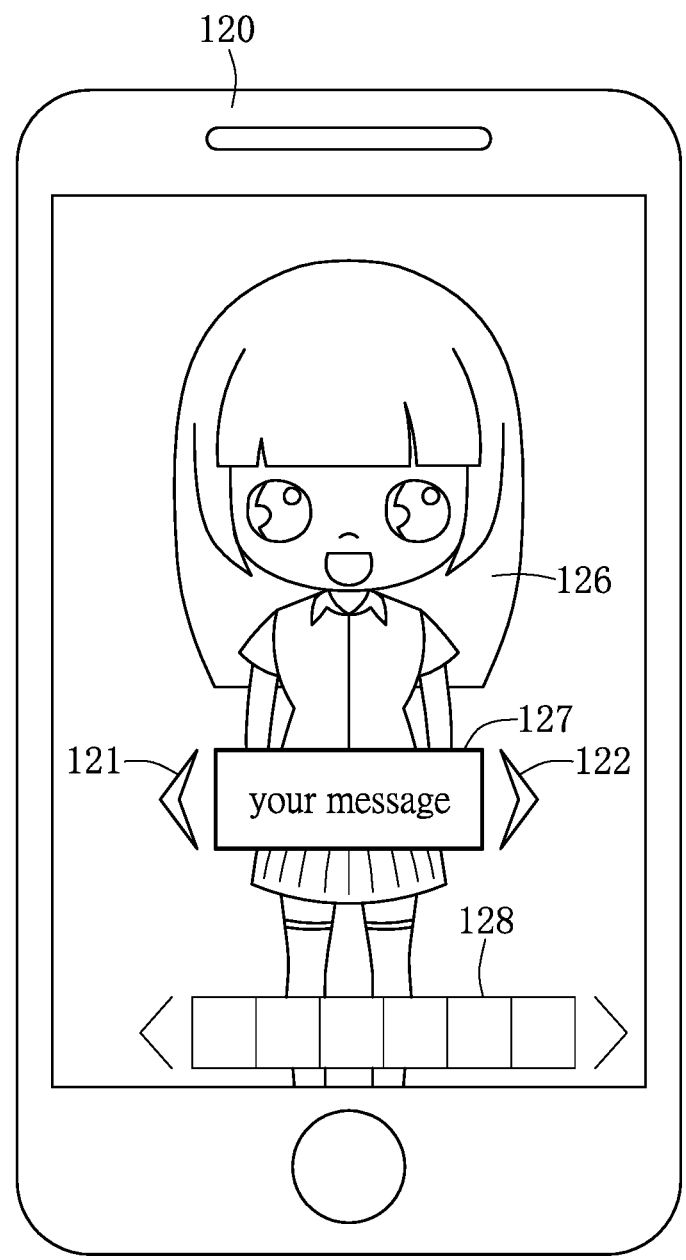
FIG. 12 shows a schematic diagram depicting a search result provided by the system and displayed on a mobile device according to one embodiment of the present disclosure.

FIG. 12 shows one further schematic diagram depicting a circumstance that the system provides a search result including multiple virtual messages for the mobile device.

A mobile device 120 is provided. An image of a moving object 126 is instantly displayed on the mobile device 120. The server (not shown in this diagram) performs a comparison against the database that records the data of multiple virtual messages based on the image information associated to the moving object 126. The search result shows that a plurality of virtual messages are found in the database based on the image information uploaded by the mobile device 120. The plurality of virtual messages listed in the search result can be filtered by the searching criteria in advance. The plurality of virtual messages can be displayed on the mobile device 120 in a specific way, as shown in the diagram. In the current example, a virtual message 127 with a first ranking is displayed on a main page. A user interface, e.g. a pair of slide-switching indicators 121 and 122, is provided for the user to switch the plurality of virtual messages using a touch-sensitive display. The user can switch the virtual messages by a left-and-right sliding gesture over the touch-sensitive display. A virtual message preview zone 128 is provided for showing further messages for selection.

Figure 13:
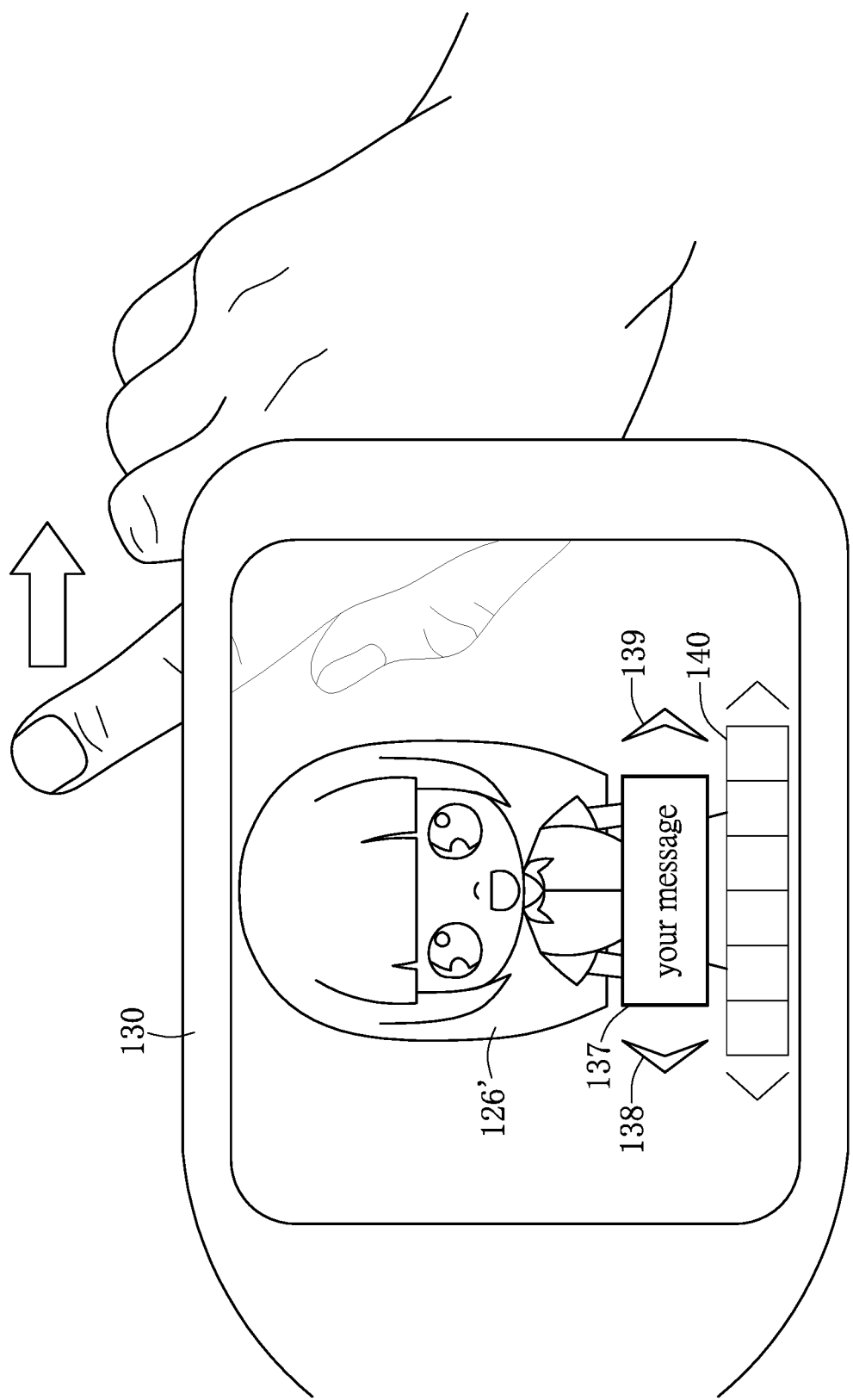
FIG. 13 shows a schematic diagram depicting another circumstance that a virtual message associated to the moving object is displayed in one further embodiment of the present disclosure.

FIG. 13 schematically shows a circumstance in which the user wears an intelligent device to show the search result in one embodiment.

The mobile device 130 is such as a glasses-type intelligent device. A camera of the intelligent device is used to capture the image of moving object 126'. An image processing method is used to retrieve the image information of the moving object 126'. The image information is then uploaded to a server. When the mobile device 130 displays the first ranking virtual message 137, a pair of gesture-switching indicators 138 and 139 are provided for the user to switch to other virtual messages by a gesture. For example, the user can utilize a left-to-right swiping gesture before the device 130 to switch the virtual messages. A virtual message preview zone 140 is also provided at the bottom of the display.

According to the above embodiments of the disclosure, the method and the system for remote management of a virtual message associated to a moving object are disclosed. The mechanism of remote management provided by the system allows the user remotely to set up the virtual message without having to be in the vicinity of the moving object. The remote management system provides the services of creating a virtual message, registering a moving object, setting up a viewable range and searching criteria relevant to the database. The positioning information associated to the moving object is mainly the image information.

If the user wishes to search a virtual message of a moving object when using a mobile device, the server provides a search result based on the image information associated to the moving object and the positioning information of the mobile device uploaded by the mobile device. The mobile device can instantly display the virtual message that matches the searching criteria over the moving object.

Thus, according to the above embodiments, provided in the disclosure is a method and a system for remote management of a virtual message associated to a moving object. Rather than a user being required to reach a location of a moving object for setting up a virtual message, the remote management system allows the user to remotely configure the virtual message and its associated moving object. The system assists the user to create the virtual message, select the moving object, and configure a viewable range and searching criteria in a database. The positioning information of the virtual message is mainly the image information associated to the moving object. When the user searches the virtual message over the moving object, the server that provides a searching service performs a comparison against the database based on the image information uploaded by the mobile device and the positioning information of the mobile device.

It is intended that the specification and depicted embodiments be considered exemplary only, with a true scope of the invention being determined by the broad meaning of the following claims.

What is claimed is:

1. A method for remote management of a virtual message associated to a moving object, comprising:

a server rendering a remote management interface;

over a network, the server receiving one or more moving objects selected via the remote management interface from a computer terminal, and a database being used to store image information with respect to every moving object, wherein the image information associated to the moving object includes color block data and line data extracted from the moving object and is used as a reference for positioning the virtual message that is configured to be associated to the moving object;

the server receiving the virtual message that is a text, a picture, a video, or a sound, or a combination thereof associated to the one or more moving objects via the remote management interface from the computer terminal;

the server receiving searching criteria that include any or a combination of a viewable range, a time period and a user range corresponding to the virtual message via the remote management interface from the computer terminal; and the server creating data of the virtual message associated to the one or more moving objects and the searching criteria corresponding to the virtual message.

2. The method of claim 1, further comprising a budget range being one of the searching criteria corresponding to the virtual message.

3. The method of claim 1, wherein the time period relates to an expiration time or a period of time to display the virtual message.

4. The method of claim 1, wherein the user range is configured to restrict one or more users who are permitted to see the virtual message.

5. The method of claim 1, wherein the viewable range includes a viewable distance range between the virtual message and the moving object associated to the virtual message.

6. The method of claim 1, wherein the remote management interface provides an electronic map that is used to configure the viewable range associated to the moving object.

7. The method of claim 1, wherein, in the server, an image processing process is used to analyze an image of the moving object for obtaining the color block data and line data associated to the moving object.

8. The method of claim 1, wherein, in the server, a face recognition process converts a human face that is referred to as the moving object into the image information used to position the virtual message.

9. A system for remote management of a virtual message associated to a moving object, comprising:

a database recording data of a plurality of moving objects and image information associated to each of the moving objects, wherein the image information associated to the moving object includes color block data and line data extracted from the moving object and is used as a reference for positioning the virtual message that is configured to be associated to the moving object;

a server including one or more processors that are used to perform a method for remote management of the virtual message associated to one of the moving objects, and the method comprising:

initiating a remote management interface;

over a network, receiving one or more moving objects selected via the remote management interface from a computer terminal, and a database being used to store the image information with respect to every moving object;

receiving the virtual message that is a text, a picture, a video, or a sound, or a combination thereof associated to the one or more moving objects via the remote management interface from the computer terminal;

receiving searching criteria that include any or a combination of a viewable range, a time period and a user range corresponding to the virtual message via the remote management interface from the computer terminal; and creating data of the virtual message associated to the one or more moving objects and the searching criteria corresponding to the virtual message.

10. The system of claim 9, wherein, in the server, an image processing process is used to analyze an image of the moving object for obtaining the color block data and line data associated to the moving object.

11. The system of claim 9, wherein, in the server, a face recognition process converts a human face that is referred to as the moving object to the image information used to position the virtual message.

* * * * *